US010933985B2

(12) United States Patent
Schank et al.

(10) Patent No.: US 10,933,985 B2
(45) Date of Patent: Mar. 2, 2021

(54) ROLLING GIMBAL LOCK SYSTEMS FOR ROTORCRAFT

(71) Applicant: Textron Innovations Inc., Providence, RI (US)

(72) Inventors: Troy Cyril Schank, Keller, TX (US); Andrew Ryan Maresh, Lewisville, TX (US); Chyau-Song Tzeng, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 689 days.

(21) Appl. No.: 16/051,334

(22) Filed: Jul. 31, 2018

(65) Prior Publication Data

US 2019/0047691 A1 Feb. 14, 2019

Related U.S. Application Data

(63) Continuation-in-part of application No. 15/428,687, filed on Feb. 9, 2017, now Pat. No. 10,526,068, which is a continuation-in-part of application No. 14/957,321, filed on Dec. 2, 2015, now Pat. No. 10,336,447.

(60) Provisional application No. 62/086,637, filed on Dec. 2, 2014.

(51) Int. Cl.
*B64C 27/52* (2006.01)
*B64C 27/32* (2006.01)
*B64C 37/00* (2006.01)
*B64C 11/28* (2006.01)
*B64C 29/00* (2006.01)
*B64C 27/30* (2006.01)

(52) U.S. Cl.
CPC ............ *B64C 27/322* (2013.01); *B64C 11/28* (2013.01); *B64C 27/30* (2013.01); *B64C 29/0033* (2013.01); *B64C 37/00* (2013.01)

(58) Field of Classification Search
CPC ....... B64C 27/322; B64C 11/28; B64C 27/22; B64C 27/30
See application file for complete search history.

(56) References Cited

U.S. PATENT DOCUMENTS

| | | | |
|---|---|---|---|
| 2,861,640 A * | 11/1958 | Du Pont | ................. B64C 27/41 416/50 |
| 3,515,500 A | 6/1970 | Nachod | |
| 3,528,630 A | 9/1970 | Ferris et al. | |
| 3,592,412 A | 7/1971 | Glatfelter | |
| 4,073,600 A * | 2/1978 | Doman | ................. B64C 27/001 416/140 |

(Continued)

*Primary Examiner* — Kayla Mccaffrey
(74) *Attorney, Agent, or Firm* — Lawrence Youst PLLC

(57) ABSTRACT

A propulsion assembly for a rotorcraft includes a mast and a proprotor hub assembly coupled to the mast and having a gimballing degree of freedom relative to the mast. The propulsion assembly includes a gimbal lock assembly positioned about the mast and including a plurality of radially outwardly extending and circumferentially distributed rollers. The gimbal lock assembly is movable between a disengaged position and an engaged position relative to the proprotor hub assembly. In the disengaged position, the gimbal lock assembly enables the gimballing degree of freedom. In the engaged position, the rollers of the gimbal lock assembly contact the proprotor hub assembly to disable the gimballing degree.

20 Claims, 12 Drawing Sheets

(56) References Cited

U.S. PATENT DOCUMENTS

| | | | |
|---|---|---|---|
| 6,622,962 B1 | 9/2003 | White | |
| 7,037,072 B2 * | 5/2006 | Carson | F03B 1/00 416/1 |
| 8,998,125 B2 | 4/2015 | Hollimon et al. | |
| 9,126,681 B1 * | 9/2015 | Judge | B64C 27/59 |
| 2016/0083087 A1 | 3/2016 | Schank et al. | |
| 2016/0152329 A1 | 6/2016 | Tzeng et al. | |

* cited by examiner

ROLLING GIMBAL LOCK SYSTEMS FOR ROTORCRAFT

CROSS-REFERENCE TO RELATED APPLICATIONS

This is a continuation-in-part of co-pending application Ser. No. 15/428,687 filed Feb. 9, 2017, which is a continuation-in-part of co-pending application Ser. No. 14/957,321 filed Dec. 2, 2015, which claims the benefit of provisional application No. 62/086,637 filed Dec. 2, 2014, the entire contents of each is hereby incorporated by reference.

TECHNICAL FIELD OF THE DISCLOSURE

The present disclosure relates, in general, to rotorcraft having one or more rotors with a gimballing degree of freedom and, in particular, to rolling gimbal lock systems for use on rotorcraft to selectively enable and disable the gimballing degree of freedom of the rotors thereon.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by utilizing proprotors that can change their plane of rotation based on the operation being performed. Tiltrotor aircraft typically have a pair of nacelles mounted near the outboard ends of a fixed wing with each nacelle housing a propulsion system that provides torque and rotational energy to a proprotor. The nacelles are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. It has been found, however, that forward airspeed induced proprotor aeroelastic instability is a limiting factor relating to the maximum airspeed of conventional tiltrotor aircraft in forward flight.

Some tiltrotor aircraft include proprotors with a gimballing degree of freedom to permit flapping. Aeroelastic forces and other phenomena can cause gimballing proprotors to overflap, especially at reduced rotational speeds, which can lead to mast bumping, large structural loads or even structural failure. Tiltrotor aircraft may thus include gimbal lock devices to prevent gimballing proprotors from overflapping. Current gimbal lock devices utilize a cone that is inserted into the proprotor hub to engage with the proprotor hub at a frictional interface that prevents rotor flapping. Gimbal lock cones with narrow angles are susceptible to binding with or becoming wedged in the proprotor hub. Conversely, gimbal lock cones with wide angles are susceptible to being pushed outward in response to the flapping forces of the rotor, resulting in less flapping stiffness. Accordingly, a need has arisen for a gimbal lock system that overcomes these and other gimbal lock deficiencies for tiltrotor aircraft and other rotorcraft types.

SUMMARY

In a first aspect, the present disclosure is directed to a propulsion assembly for a rotorcraft including a mast and a proprotor hub assembly coupled to the mast and having a gimballing degree of freedom relative to the mast. The propulsion assembly includes a gimbal lock assembly positioned about the mast and including a plurality of radially outwardly extending and circumferentially distributed rollers. The gimbal lock assembly is movable between a disengaged position and an engaged position relative to the proprotor hub assembly. In the disengaged position, the gimbal lock assembly enables the gimballing degree of freedom. In the engaged position, the rollers of the gimbal lock assembly contact the proprotor hub assembly to disable the gimballing degree.

In some embodiments, the proprotor hub assembly may include a gimbal lock receptacle adapted to receive the gimbal lock assembly and the gimbal lock assembly may be at least partially inserted into the gimbal lock receptacle in the engaged position such that the rollers contact the gimbal lock receptacle. In certain embodiments, the gimbal lock receptacle may include a tubular gimbal lock receptacle having an annular inner wall, the rollers contacting the annular inner wall in the engaged position. In some embodiments, the rollers may each include a bulging central section to form a substantially matching curvature with the annular inner wall. In certain embodiments, the gimbal lock assembly may include a locking ring positioned about the mast, the locking ring including the rollers. In some embodiments, the locking ring may include a tapered gimbal lock cap. In certain embodiments, the gimbal lock assembly may include an actuation subassembly operably associated with the locking ring to raise and lower the locking ring relative to the mast to transition the gimbal lock assembly between the engaged and disengaged positions. In some embodiments, the actuation subassembly may include a lifting ring operably associated with the locking ring, a lifting fork having a bifurcated end coupled to the lifting ring and an actuator coupled to the lifting fork operable to raise and lower the locking ring between the engaged and disengaged positions. In certain embodiments, the gimbal lock assembly may have a mast-facing inner wall comprising a barrier liner. In some embodiments, each of the rollers may be housed within a roller cartridge. In certain embodiments, each of the roller cartridges may include a cartridge housing forming a slot and a roller bracket disposed in the slot to support the roller. In some embodiments, the slot of each cartridge housing may include a roller-facing wall forming a contoured race to complement a curvature of the roller. In certain embodiments, each of the roller cartridges may include one or more springs biasing the roller bracket and the roller in a first direction. In some embodiments, for each of the roller cartridges, the roller bracket and the roller may translate in a second direction opposite of the first direction against the bias force of the one or more springs in response to the roller engaging with the proprotor hub assembly.

In a second aspect, the present disclosure is directed to a tiltrotor aircraft including a fuselage, a wing coupled to the fuselage and a propulsion assembly rotatably coupled to the wing. The propulsion assembly includes a mast and a proprotor hub assembly coupled to the mast and having a gimballing degree of freedom relative to the mast. The propulsion assembly includes a gimbal lock assembly positioned about the mast and including a plurality of radially outwardly extending and circumferentially distributed rollers. The gimbal lock assembly is movable relative to the proprotor hub assembly between a disengaged position and an engaged position. In the disengaged position, the gimbal lock assembly enables the gimballing degree of freedom. In the engaged position, the rollers of the gimbal lock assembly contact the proprotor hub assembly to disable the gimballing degree.

In some embodiments, the tiltrotor aircraft may be operable to transition between a rotary flight mode and a non rotary flight mode, and the gimbal lock assembly may be moveable into the engaged position in the non rotary flight mode to stabilize the proprotor hub assembly. In certain embodiments, the gimbal lock assembly may be moveable into the disengaged position in the rotary flight mode to permit flapping of the proprotor hub assembly. In some embodiments, the tiltrotor aircraft may have a vertical takeoff and landing flight mode, and the gimbal lock assembly may be moveable into the disengaged position in the vertical takeoff and landing flight mode to permit flapping of the proprotor hub assembly. In certain embodiments, the gimbal lock assembly may include a locking ring positioned about the mast and the locking ring may include the rollers. In such embodiments, the proprotor hub assembly may include a tubular gimbal lock receptacle adapted to receive the locking ring in the engaged position such that the rollers contact an annular inner wall of the gimbal lock receptacle. In certain embodiments, the rollers may rotate and translate in response to engaging with the proprotor hub assembly.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
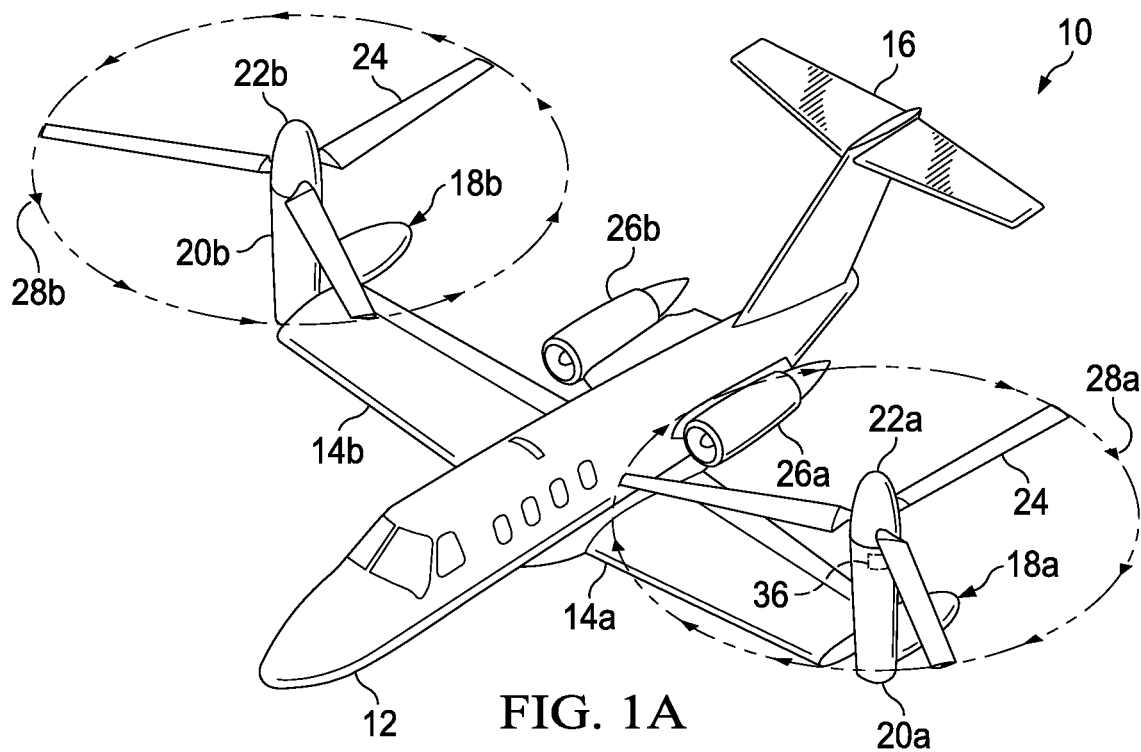
FIGS. 1A-1F are schematic illustrations of a tiltrotor aircraft in various flight modes in accordance with embodiments of the present disclosure.
Figure 1B:
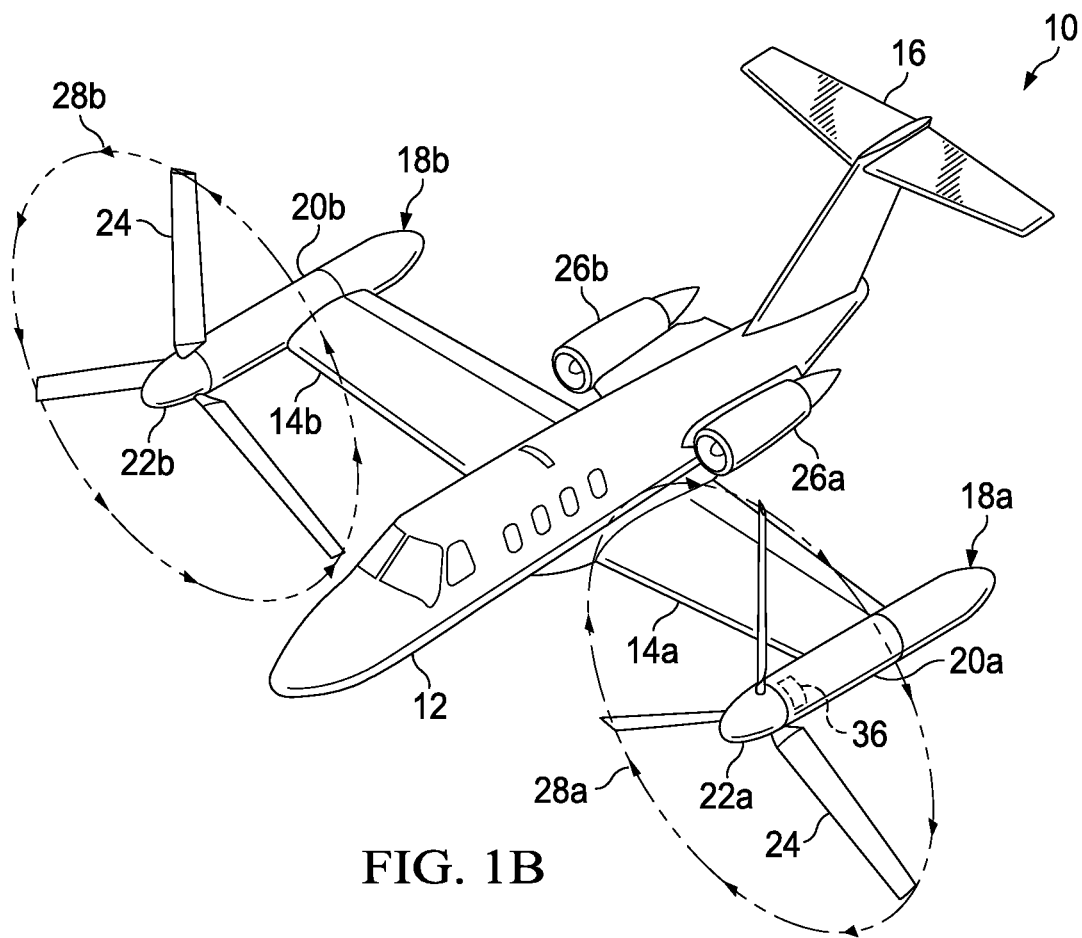
Figure 1C:
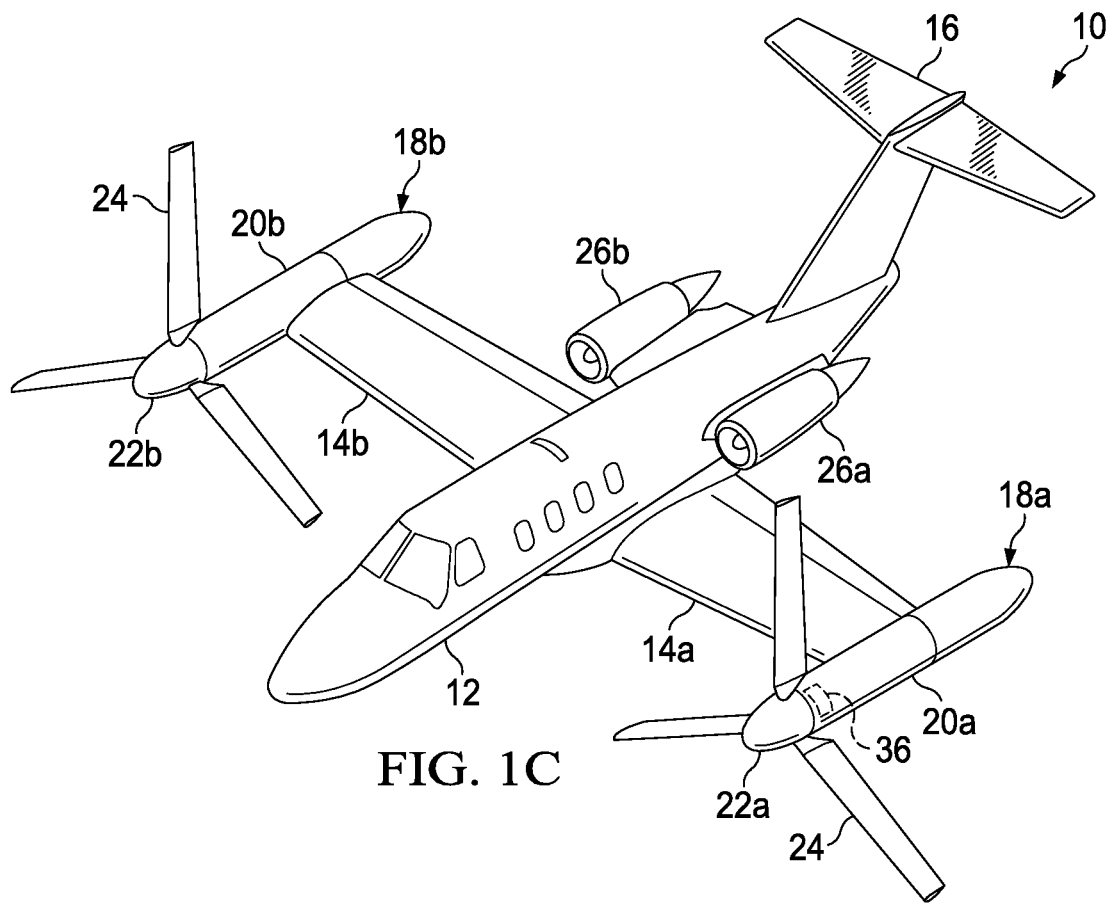
Figure 1D:
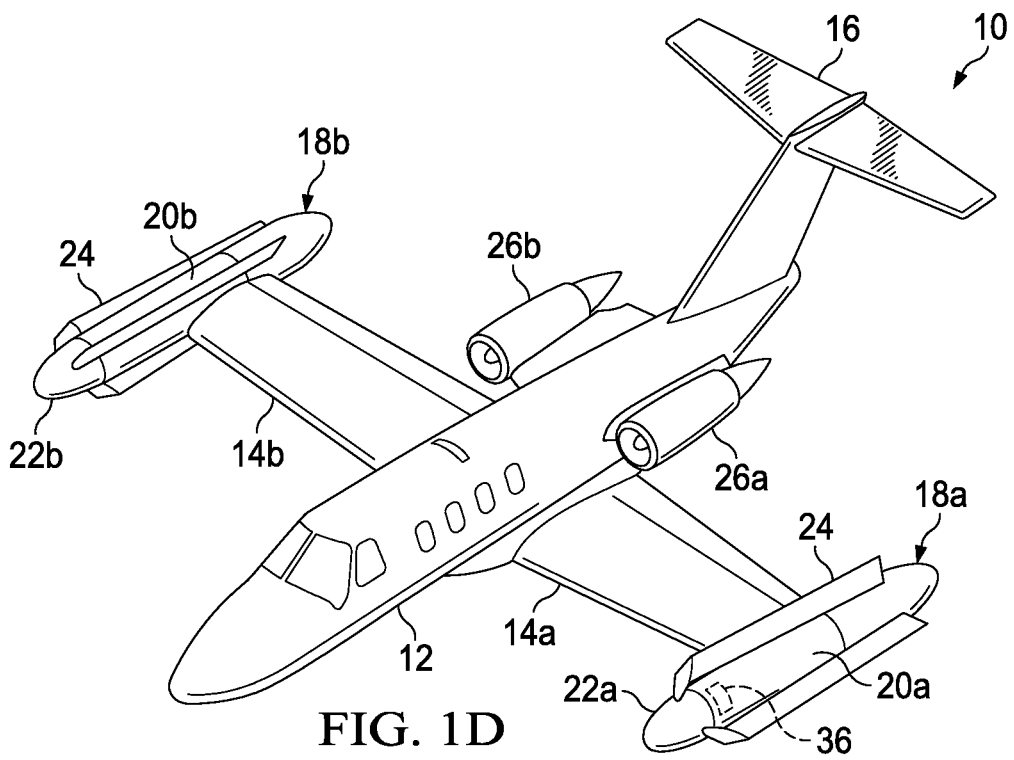

Referring to FIGS. 1A-1F in the drawings, a tiltrotor aircraft is schematically illustrated and generally designated 10. Tiltrotor aircraft 10 includes a fuselage 12, wings 14a, 14b coupled to fuselage 12 and a tail assembly 16 including control surfaces operable for horizontal and/or vertical stabilization during forward flight. Located proximate the outboard ends of wings 14a, 14b are propulsion assemblies 18a, 18b including pylon assemblies 20a, 20b that are rotatable relative to wings 14a, 14b between a generally vertical orientation, as best seen in FIG. 1A, and a generally horizontal orientation, as best seen in FIGS. 1B-1D. Pylon assemblies 20a, 20b each house a portion of a drive system that is used to rotate proprotor hub assemblies 22a, 22b, respectively. Each proprotor hub assembly 22a, 22b includes a plurality of proprotor blades 24 that are operable to be rotated, as best seen in FIGS. 1A-1B, operable to be feathered, as best seen in FIG. 1C and operable to be folded, as best seen in FIG. 1D. In the illustrated embodiment, proprotor hub assembly 22a is rotated responsive to torque and rotational energy provided by engine 26a and proprotor hub assembly 22b is rotated responsive to torque and rotational energy provided by engine 26b. Engines 26a, 26b are located proximate an aft portion of fuselage 12. Engines 26a, 26b are operable in a turboshaft mode, as best seen in FIGS. 1A-1B and a turbofan mode, as best seen in FIGS. 1C-1D.

FIG. 1A illustrates tiltrotor aircraft 10 in VTOL or helicopter flight mode, in which proprotor hub assemblies 22a, 22b are rotating in a substantially horizontal plane to provide a lifting thrust, such that tiltrotor aircraft 10 flies much like a conventional helicopter. In this configuration, engines 26a, 26b are operable in turboshaft mode wherein hot combustion gases in each engine 26a, 26b cause rotation of a power turbine coupled to an output shaft that is used to power the drive system coupled to the respective proprotor hub assemblies 22a, 22b. Thus, in this configuration, tiltrotor aircraft 10 is considered to be in a rotary flight mode. FIG. 1B illustrates tiltrotor aircraft 10 in proprotor forward flight mode, in which proprotor hub assemblies 22a, 22b are rotating in a substantially vertical plane to provide a forward thrust enabling wings 14a, 14b to provide a lifting force responsive to forward airspeed, such that tiltrotor aircraft 10 flies much like a conventional propeller driven aircraft. In this configuration, engines 26a, 26b are operable in the turboshaft mode and tiltrotor aircraft 10 is considered to be in the rotary flight mode.

In the rotary flight mode of tiltrotor aircraft 10, proprotor hub assemblies 22a, 22b rotate in opposite directions to provide torque balancing to tiltrotor aircraft 10. For example, when viewed from the front of tiltrotor aircraft 10 in proprotor forward flight mode (FIG. 1B) or from the top in helicopter mode (FIG. 1A), proprotor hub assembly 22a rotates clockwise, as indicated by motion arrows 28a, and proprotor hub assembly 22b rotates counterclockwise, as indicated by motion arrows 28b. In the illustrated embodiment, proprotor hub assemblies 22a, 22b each include three proprotor blades 24 that are equally spaced apart circumferentially at approximately 120 degree intervals. It should be understood by those having ordinary skill in the art, however, that the proprotor hub assemblies of the present disclosure could have proprotor blades with other designs and other configurations including proprotor hub assemblies having four, five or more proprotor blades. In addition, it should be appreciated that tiltrotor aircraft 10 can be operated such that proprotor hub assemblies 22a, 22b are selectively positioned between proprotor forward flight mode and helicopter mode, which can be referred to as a conversion flight mode.

FIG. 1C illustrates tiltrotor aircraft 10 in transition between proprotor forward flight mode and airplane forward flight mode, in which engines 26a, 26b have been disengaged from proprotor hub assemblies 22a, 22b and proprotor blades 24 of proprotor hub assemblies 22a, 22b have been feathered, or oriented to be streamlined in the direction of flight, such that proprotor blades 24 act as brakes to aerodynamically stop the rotation of proprotor hub assemblies 22a, 22b. In this configuration, engines 26a, 26b are operable in turbofan mode wherein hot combustion gases in each engine 26a, 26b cause rotation of a power turbine coupled to an output shaft that is used to power a turbofan that forces bypass air through a fan duct to create forward thrust enabling wings 14a, 14b to provide a lifting force responsive to forward airspeed, such that tiltrotor aircraft 10 flies much like a conventional jet aircraft. Thus, in this configuration, tiltrotor aircraft 10 is considered to be in a non rotary flight mode. FIG. 1D illustrates tiltrotor aircraft 10 in airplane forward flight mode, in which proprotor blades 24 of proprotor hub assemblies 22a, 22b have been folded to be oriented substantially parallel to respective pylon assemblies 20a, 20b to minimize the drag force generated by proprotor blades 24. In this configuration, engines 26a, 26b are operable in the turbofan mode and tiltrotor aircraft 10 is considered to be in the non rotary flight mode. The forward cruising speed of tiltrotor aircraft 10 can be significantly higher in airplane forward flight mode versus proprotor forward flight mode as the forward airspeed induced proprotor aeroelastic instability is overcome.

Figure 1E:
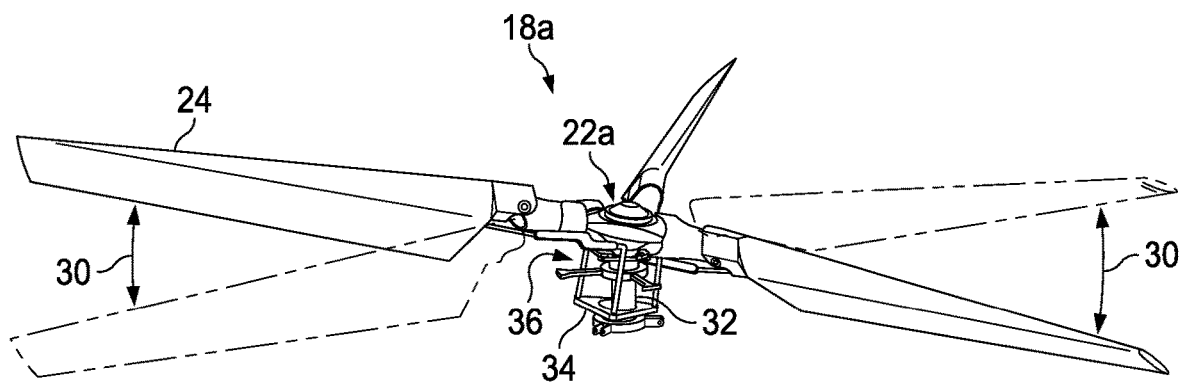

Proprotor hub assembly 22a is substantially similar to proprotor hub assembly 22b therefore, for sake of efficiency, certain features will be disclosed only with regard to proprotor hub assembly 22a. One having ordinary skill in the art, however, will fully appreciate an understanding of proprotor hub assembly 22b based on the disclosure herein of proprotor hub assembly 22a. As best seen in FIG. 1E, proprotor hub assembly 22a has a gimballing degree of freedom relative to mast 32 that is depicted with arrows 30 and the phantom rotor blades. This flapping motion allows proprotor hub assembly 22a to vary its plane of rotation. Rotor flapping capability enhances directional control of tiltrotor aircraft 10. For example, the plane of rotation of proprotor hub assembly 22a may be varied to provide forward, aft, left or right directional thrust for tiltrotor aircraft 10 in helicopter flight mode. The position of swashplate 34 may be used to control the amplitude of flapping motion 30. Flapping motion 30 may be managed manually by a pilot or using control laws implemented by a flight control computer onboard tiltrotor aircraft 10 or elsewhere. In various operational modes of tiltrotor aircraft 10, but especially at reduced or zero revolutions per minute (RPM) operation of proprotor hub assembly 22a, centrifugal forces may decrease and aerodynamic forces can cause large flapping motions, or overflapping, of proprotor hub assembly 22a. Overflapping can lead to mast bumping, large structural loads or even structural failure of tiltrotor aircraft 10.

Figure 1F:
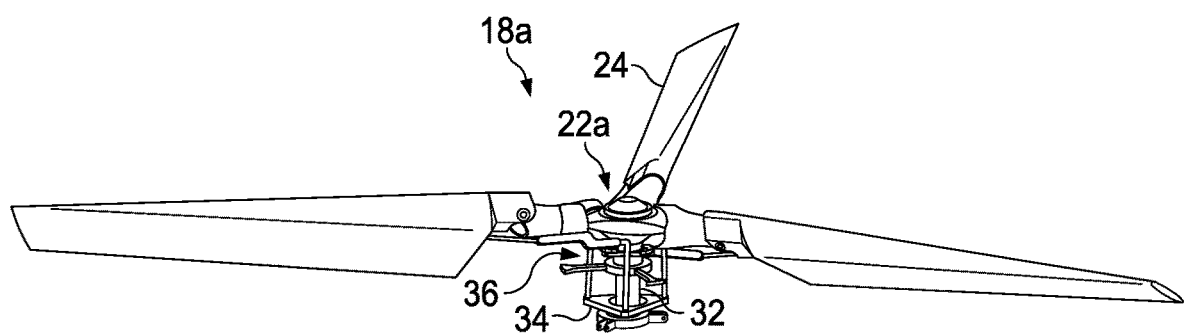

Propulsion assembly 18a includes a rolling gimbal lock assembly 36 positioned about and movable along mast 32 to enable or disable gimballing degree of freedom 30 of proprotor hub assembly 22a. In FIG. 1E, gimballing degree of freedom 30 is unlocked and rotor flapping is enabled. In FIG. 1F, gimballing degree of freedom 30 is locked and rotor flapping is disabled. Rolling gimbal lock assembly 36 moves between the disengaged position of FIG. 1E and the engaged position of FIG. 1F depending on the operational circumstances. In one scenario, rolling gimbal lock assembly 36 is engaged to lock out gimballing degree of freedom 30 at reduced or zero RPM operation of proprotor hub assembly 22a. For example, rolling gimbal lock assembly 36 may be engaged when proprotor hub assembly 22a is being slowed to a stop and feathered in turbofan or non rotary flight mode as shown in FIG. 1C and/or in preparation for folding proprotor blades 24 as shown in FIG. 1D. Conversely, rolling gimbal lock assembly 36 may be disengaged after unfolding proprotor blades 24 in preparation for transitioning into turboshaft or rotary flight mode.

Even though tiltrotor aircraft 10 has been described as having two engines fixed to the fuselage each operating a respective proprotor hub assembly 22a, 22b in the rotary flight mode, it should be understood by those having ordinary skill in the art that other engine arrangements are possible and are considered to be within the scope of the present disclosure including, for example, having a single engine that provides torque and rotational energy to both proprotor hub assemblies 22a, 22b. In addition, even though proprotor hub assemblies 22a, 22b are illustrated in the context of tiltrotor aircraft 10, it should be understood by those having ordinary skill in the art that the proprotor hub assemblies disclosed herein can be implemented on other tiltrotor aircraft including, for example, quad tiltrotor aircraft having one or more additional wing members aft of wings 14a, 14b, unmanned tiltrotor aircraft or other tiltrotor aircraft configurations. It should be appreciated that tiltrotor rotorcraft 10 is merely illustrative of a variety of aircraft that can implement the embodiments disclosed herein. Indeed, rolling gimbal lock assembly 36 may be utilized on any aircraft having one or more rotors. Other aircraft implementations can include hybrid aircraft, compound aircraft, tiltwing aircraft, quad tiltrotor aircraft, helicopters, propeller airplanes, unmanned aerial systems and the like. As such, those skilled in the art will recognize that rolling gimbal lock assembly 36 disclosed herein can be integrated into a variety of aircraft configurations. It should be appreciated that even though aircraft are particularly well-suited to implement the embodiments of the present disclosure, non-aircraft vehicles and devices can also implement the embodiments.

Figure 2A:
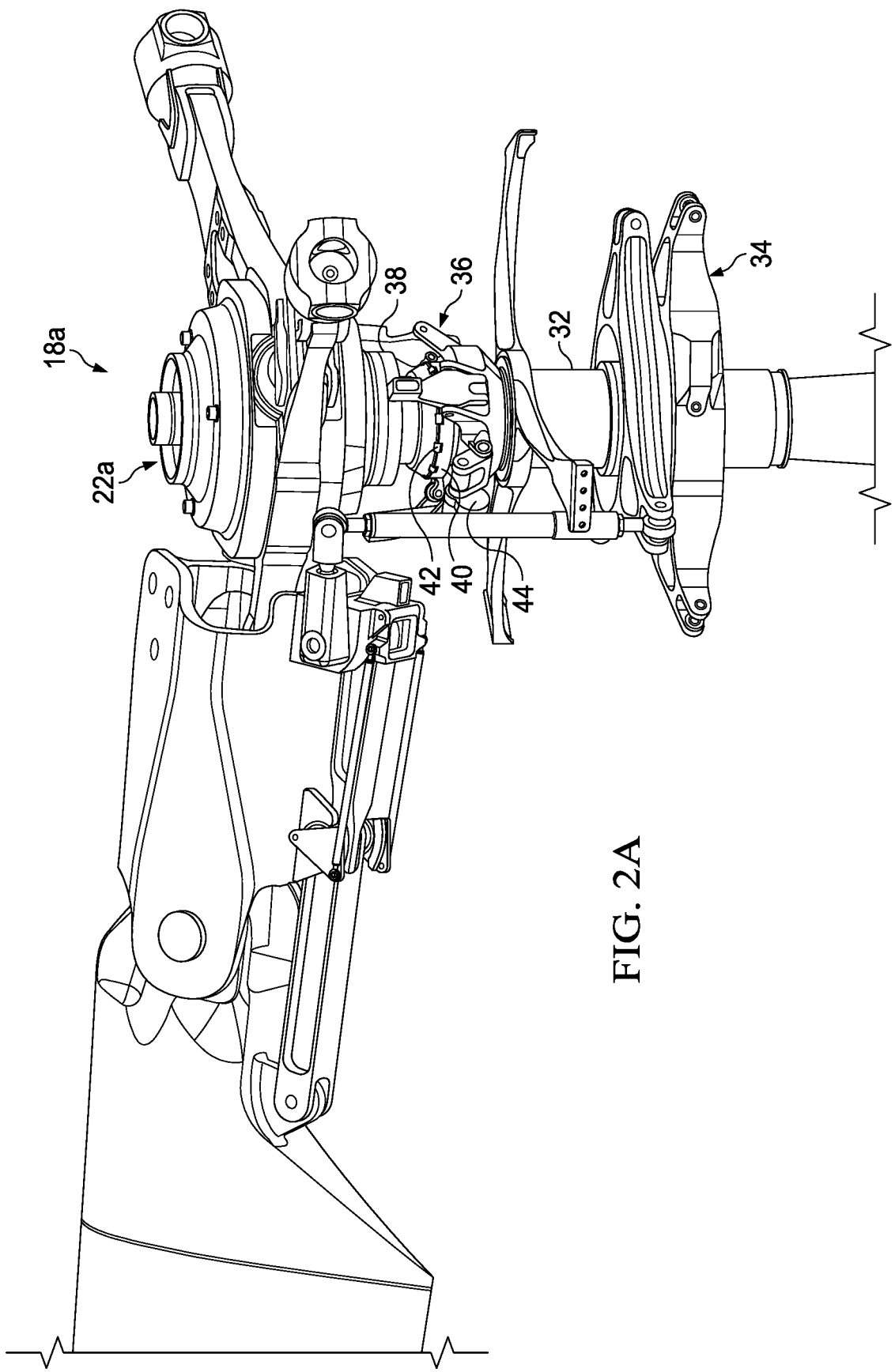
FIGS. 2A-2B are isometric views of a proprotor hub assembly in accordance with embodiments of the present disclosure.
Figure 2B:
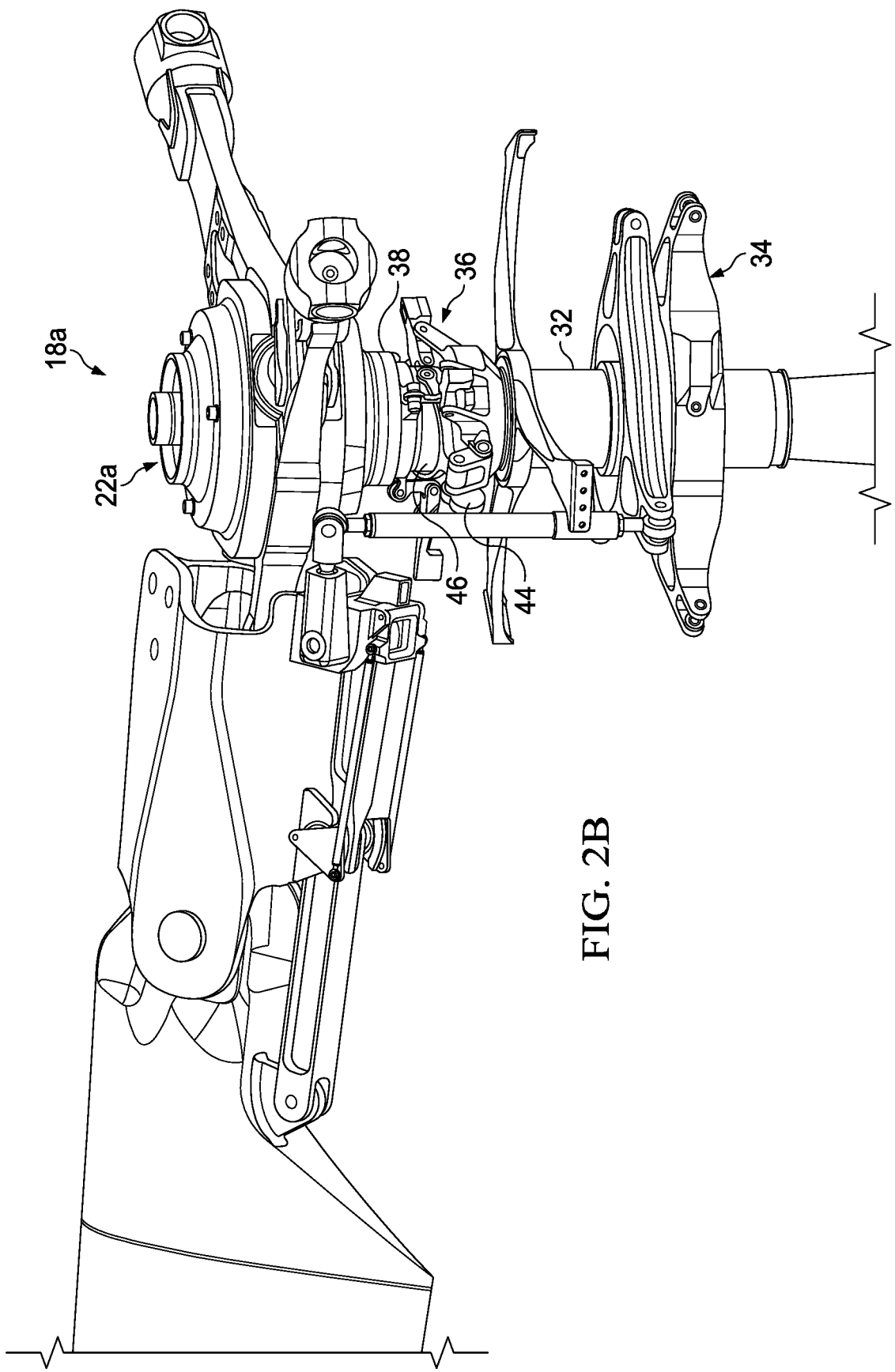

Referring to FIGS. 2A-2B in the drawings, propulsion assembly 18a includes proprotor hub assembly 22a, mast 32 and rolling gimbal lock assembly 36. Proprotor hub assembly 22a includes a gimbal lock receptacle 38 extending from proprotor hub assembly 22a. Rolling gimbal lock assembly 36 is coupled to and operable to rotate with mast 32. Rolling gimbal lock assembly 36 includes a locking ring 40 including rollers 42. Rolling gimbal lock assembly 36 also includes an actuator subassembly 44 and a lifting ring 46. Rolling gimbal lock assembly 36 is operable to selectively enable and disable the gimballing degree of freedom of proprotor hub assembly 22a relative to mast 32. As best seen in FIG. 2A, rolling gimbal lock assembly 36 is disengaged from proprotor hub assembly 22a, which enables the gimballing degree of freedom of proprotor hub assembly 22a. Locking ring 40 does not contact gimbal lock receptacle 38 in the disengaged position. In this configuration, there is an axial separation between locking ring 40 of rolling gimbal lock assembly 36 and gimbal lock receptacle 38 of proprotor hub assembly 22a such that any teetering or flapping motion of proprotor hub assembly 22a is not impacted by rolling gimbal lock assembly 36. When it is desired to transition the tiltrotor aircraft from the rotary flight mode to the non rotary flight mode, proprotor hub assembly 22a may be stabilized at or near an orthogonal position relative to mast 32 by the manual or automated control of swashplate 34 to allow rolling gimbal lock assembly 36 to be inserted into gimbal lock receptacle 38. Actuator subassembly 44 may be operated to cause lifting ring 46 to raise locking ring 40 into gimbal lock receptacle 38 of proprotor hub assembly 22a. In this configuration, as best seen in FIG. 2B, rolling gimbal lock assembly 36 is engaged with gimbal lock receptacle 38 of proprotor hub assembly 22a, which disables the gimballing degree of freedom of proprotor hub assembly 22a relative to mast 32 for non rotary flight.

Rollers 42 prevent binding between rolling gimbal lock assembly 36 and gimbal lock receptacle 38 and allow for narrow cone angles if desired. The resulting hub reaction moments are primarily normal to the rolling gimbal lock assembly translational direction and to mast 32, which promotes stiffness between rolling gimbal lock assembly 36 and proprotor hub assembly 22a. Rollers 42 may engage with gimbal lock receptacle 38 with a radially outward preload that causes all rollers 42 to engage with gimbal lock receptacle 38 to maximize stiffness. In the illustrated embodiment, locking ring 40 has a geometry that is configured to mate with a similar, complementary geometry of gimbal lock receptacle 38, thus disabling the gimballing degree of freedom of proprotor hub assembly 22a relative to mast 32 in the engaged position. It should be appreciated, however, that the exact mating geometry of locking ring 40 and gimbal lock receptacle 38 is implementation specific and not limited to the illustrated geometry.

The operation of rolling gimbal lock assembly 36 will now be described with reference to an exemplary flight of tiltrotor aircraft 10 in FIGS. 1A-1D. For vertical takeoff and hovering in helicopter flight mode, as best seen in FIG. 1A, and low speed forward flight in proprotor flight mode, as best seen in FIG. 1B, tiltrotor aircraft 10 is in rotary flight mode. To achieve this operational mode, engines 26a, 26b are in turboshaft mode to provide torque and rotational energy to proprotor hub assemblies 22a, 22b and rolling gimbal lock assembly 36 is in the disengaged position to enable the gimballing degree of freedom of proprotor hub assembly 22a and permit flapping of proprotor hub assembly 22a, as best seen in FIG. 2A. When it is desired to transition tiltrotor aircraft 10 from low speed forward flight in proprotor forward flight mode, as best seen in FIG. 1B, to high speed forward flight in airplane forward flight mode, as best seen in FIG. 1D, the gimballing degree of freedom of proprotor hub assembly 22a is disabled by actuator subassembly 44 raising lifting ring 46 to insert locking ring 40 into gimbal lock receptacle 38 of proprotor hub assembly 22a, as best seen in FIG. 2B. Tiltrotor aircraft 10 is now in airplane forward flight mode, which is the high speed forward flight mode of tiltrotor aircraft 10 and is a non rotary flight mode. In this operational mode, engines 26a, 26b are in turbofan mode providing no torque or rotational energy to proprotor hub assemblies 22a, 22b and rolling gimbal lock assembly 36 is in the engaged position disabling the gimballing degree of freedom of proprotor hub assembly 22a, thus stabilizing proprotor hub assembly 22a. When it is desired to transition back to proprotor forward flight mode, as best seen in FIG. 1B, from airplane forward flight mode, as best seen in FIG. 1D, the gimballing degree of freedom of proprotor hub assembly 22a may again be enabled by actuator subassembly 44 lowering lifting ring 46 to bring locking ring 40 out of engagement with gimbal lock receptacle 38 of proprotor hub assembly 22a, as best seen in FIG. 2A. Engines 26a, 26b are then transitioned from turbofan mode to turboshaft mode such that forward thrust is provided by proprotor hub assemblies 22a, 22b and tiltrotor aircraft 10 is in rotary flight mode. From this configuration, tiltrotor aircraft 10 may now be transitioned to helicopter mode when it is desired to hover and/or land the aircraft.

Figure 3A:
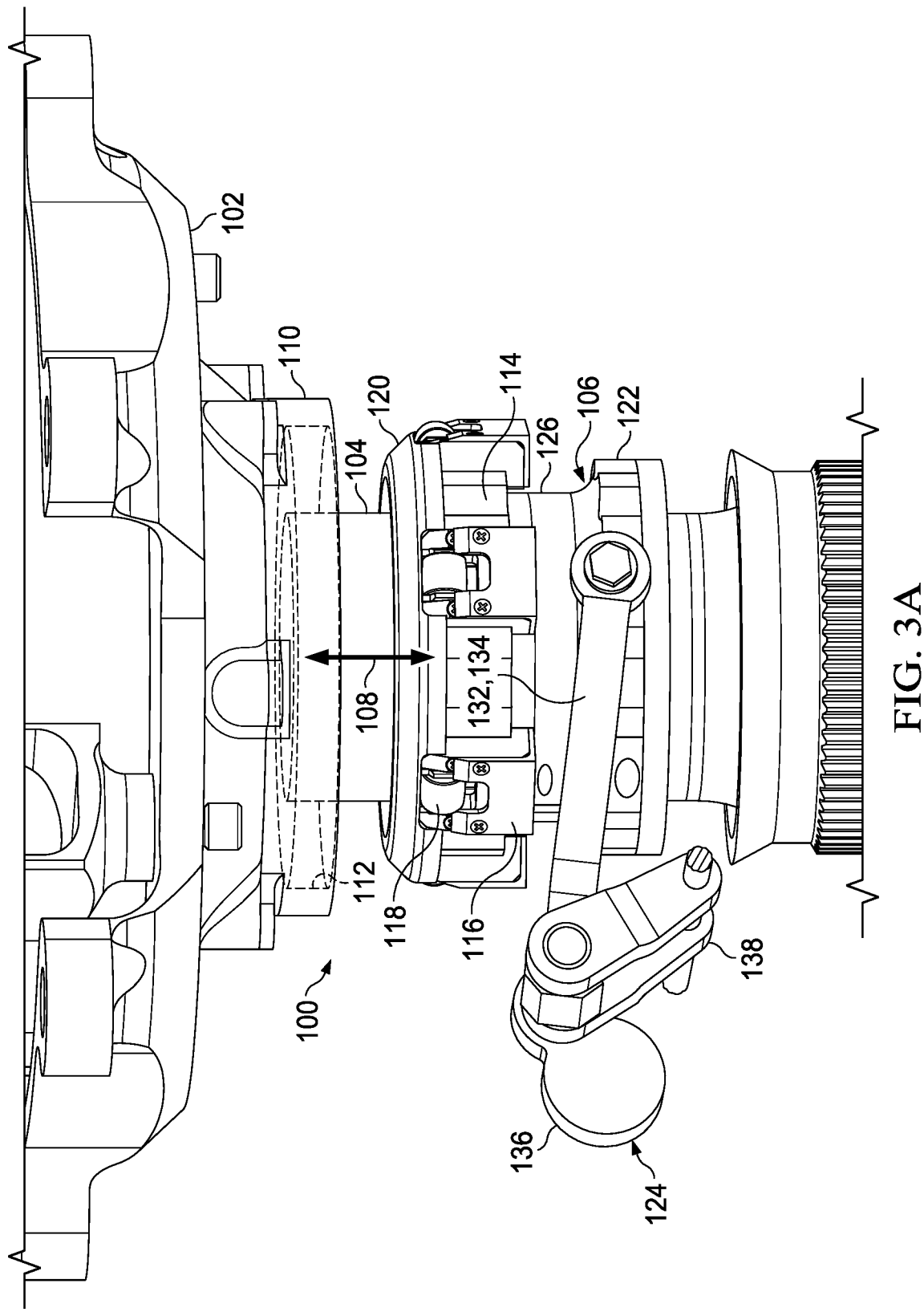
FIGS. 3A-3B are isometric views of a rolling gimbal lock assembly in accordance with embodiments of the present disclosure.
Figure 3B:
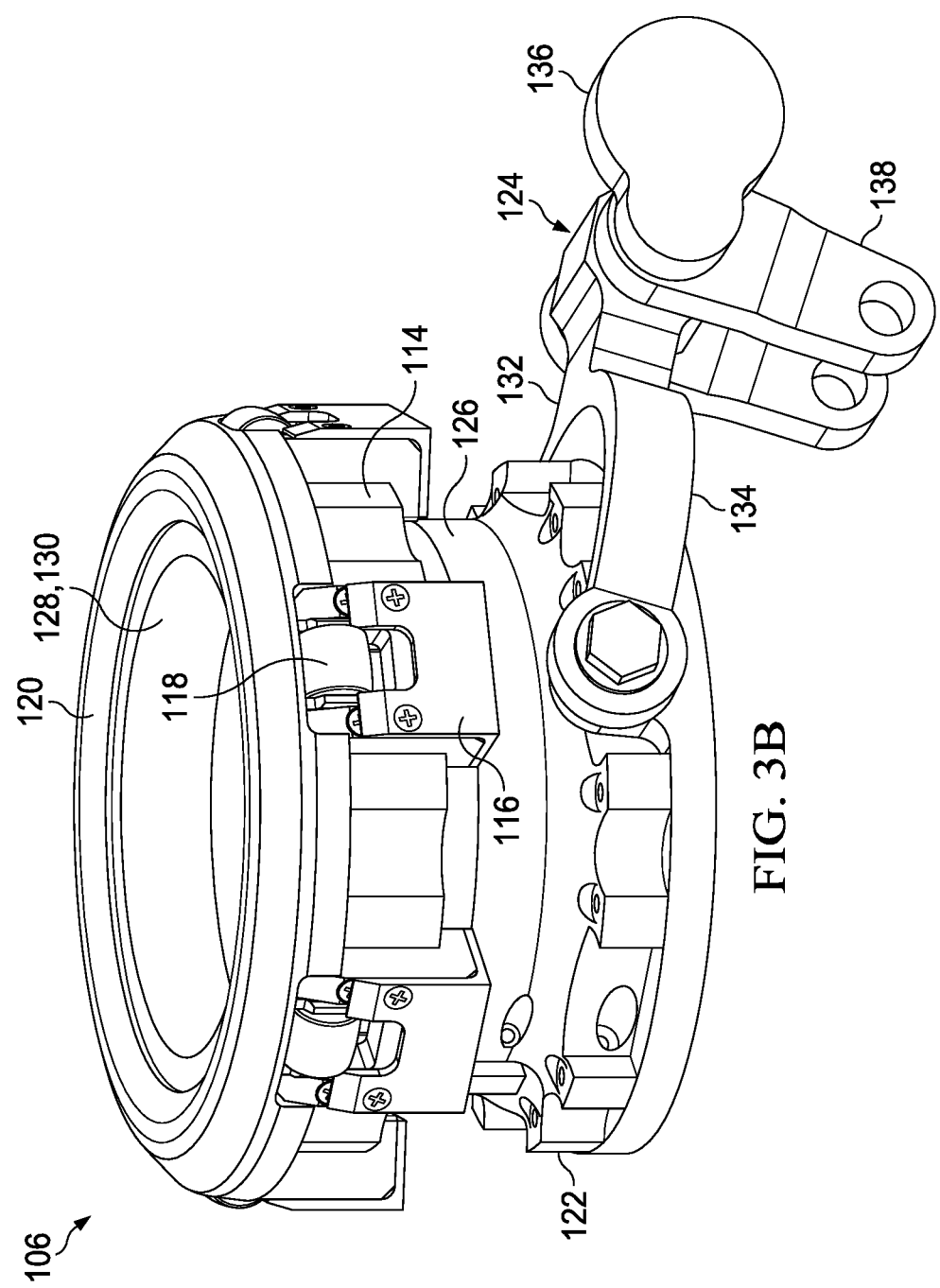

Referring to FIGS. 3A-3B in the drawings, propulsion assembly 100 includes proprotor hub assembly 102, which has a gimballing degree of freedom relative to mast 104. Rolling gimbal lock assembly 106 is positioned about mast 104 and is slidable between a disengaged position, shown in FIG. 3A, and an engaged position relative to proprotor hub assembly 102. Rolling gimbal lock assembly 106 is raised into the engaged position and lowered into the disengaged position along axial directional arrow 108. Rolling gimbal lock assembly 106 enables the gimballing degree of freedom of proprotor hub assembly 102 in the disengaged position. In the engaged position, gimbal lock receptacle 110 receives rolling gimbal lock assembly 106 to disable the gimballing degree of freedom of proprotor hub assembly 102. Gimbal lock receptacle 110 has a tubular shape and forms an annular inner wall 112.

Rolling gimbal lock assembly 106 includes locking ring 114 positioned about mast 104. Roller cartridges 116 are arranged along an outer circumference of locking ring 114. Each roller cartridge 116 includes a roller 118 that extends radially outwardly from the respective roller cartridge 116 and thus locking ring 114. In the illustrated embodiment, roller cartridges 116 are coupled to locking ring 114 with a plurality of screws. In other embodiments, roller cartridges 116 may be coupled to locking ring 114 in any suitable manner using fasteners, adhesive or other mechanical connections. In still other embodiments, roller cartridges 116 may be integral with locking ring 114. While locking ring 114 is shown to include six roller cartridges 116 that are uniformly distributed circumferentially about locking ring 114, it should be understood by those having ordinary skill in the art that a locking ring of the present disclosure could have any number of roller cartridges that are uniformly or nonuniformly distributed circumferentially thereabout. Locking ring 114 includes a gimbal lock cap 120 that has a conical or tapered surface to facilitate self-centering of locking ring 114 as locking ring 114 is inserted into gimbal lock receptacle 110. Gimbal lock cap 120 may also act as a bumper that absorbs shock loads from gimbal lock receptacle 110 as proprotor hub assembly 102 flaps while rolling gimbal lock assembly 106 is in the engaged or partially engaged position. The tapering of gimbal lock cap 120 may also be utilized by partially inserting locking ring 114 into gimbal lock receptacle 110 such that gimbal lock cap 120 allows for small flapping motions only.

Rolling gimbal lock assembly 106 includes lifting ring 122 to which actuation subassembly 124 is rotatably coupled to raise and lower locking ring 114 relative to mast 104 and transition rolling gimbal lock assembly 106 between the engaged and disengaged positions. Rolling gimbal lock assembly 106 is lifted or lowered vertically through its center via lifting ring 122. Interposed between locking ring 114 and lifting ring 122 is an extension tube 126. In some embodiments, extension tube 126 may be an extension tube subassembly formed from two or more tube portions, such as two tube halves, which may be useful when assembling rolling gimbal lock assembly 106 around a subsection of mast 104 that is narrower than the remainder of mast 104. In these embodiments, the two or more tube portions may be coupled to one another to encircle the narrowed portion of mast 104 along which rolling gimbal lock assembly 106 is slidable. A mast-facing inner wall 128 of rolling gimbal lock assembly 106 may be partially or fully covered by a barrier liner 130, which may provide a protective barrier or bushing between rolling gimbal lock assembly 106 and mast 104. Barrier liner 130 may also facilitate the sliding action of rolling gimbal lock assembly 106 along mast 104. Barrier liner 130 may be formed from any suitable barrier or protective material, such as Teflon. In some embodiments, barrier liner 130 may be formed from two or more inner pads. In embodiments in which extension tube 126 extends axially through the centers of locking ring 114 and lifting ring 122, barrier liner 130 may cover the mast-facing inner wall of extension tube 126. In other embodiments, barrier liner 130 may cover the mast-facing inner wall of locking ring 114 and/or lifting ring 122.

Actuation subassembly 124 includes a lifting fork 132 having a bifurcated end 134 coupled to lifting ring 122. An actuator 136, such as a rotary actuator having an angular output, is coupled to lifting fork 132 and operable to raise and lower locking ring 114 between the engaged and disengaged positions. Actuators other than rotary actuators that are capable of moving rolling gimbal lock assembly 106 along axial directional arrow 108 may also be used. In some embodiments, actuation subassembly 124 may include an idler 138 coupled to lifting fork 132 and/or actuator 136. When actuation subassembly 124 raises rolling gimbal lock assembly 106 into the engaged position, gimbal lock receptacle 110 receives locking ring 114 such that rollers 118 contact annular inner wall 112 of gimbal lock receptacle 110. Rollers 118 may be inserted into gimbal lock receptacle 110 using a low axial actuation force and may provide a high degree of stiffness to prevent flapping of proprotor hub assembly 102. Roller cartridges 116 provide rollers 118 with strength to withstand the potentially high loads caused by the flapping of proprotor hub assembly 102.

Figure 4A:
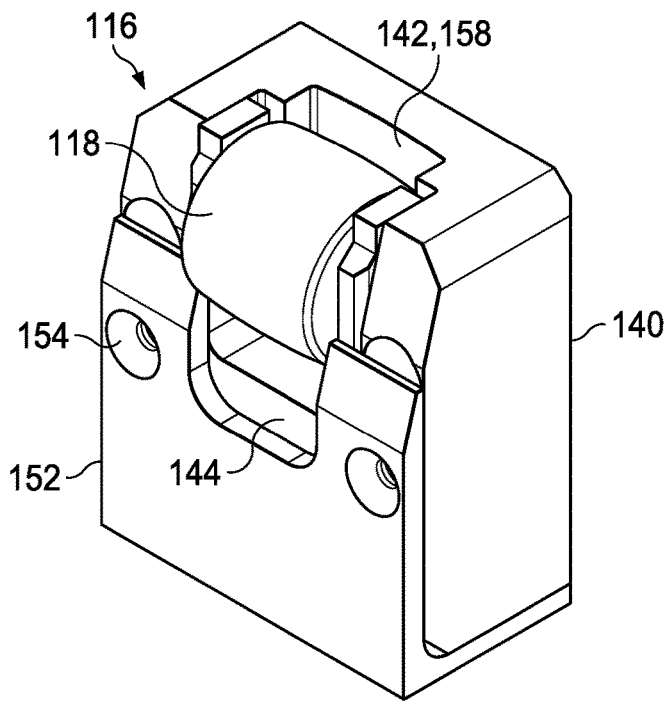
FIGS. 4A-4D are various views of a roller cartridge in accordance with embodiments of the present disclosure.
Figure 4B:
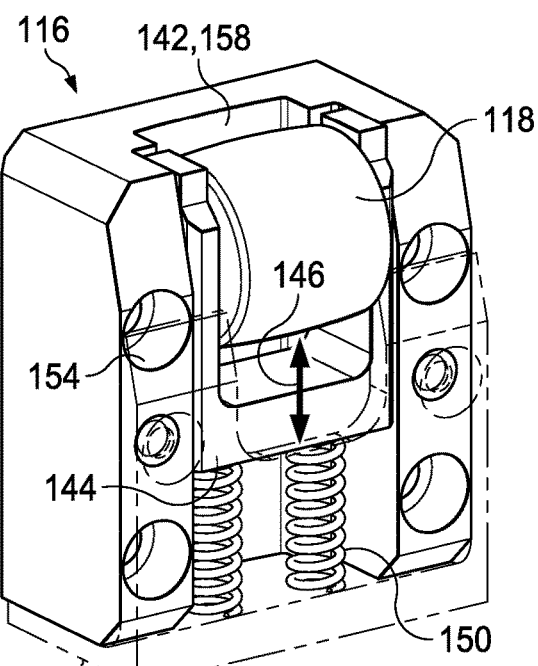
Figure 4C:
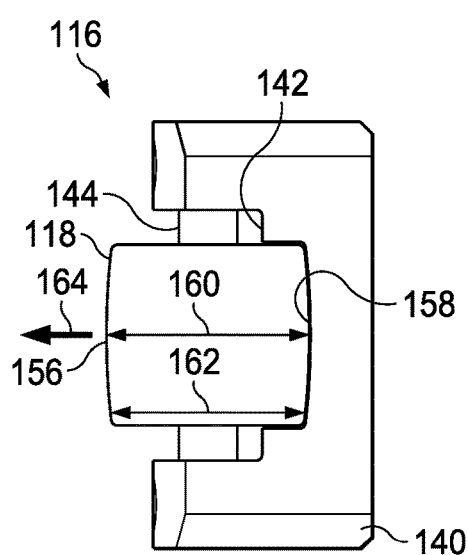
Figure 4D:
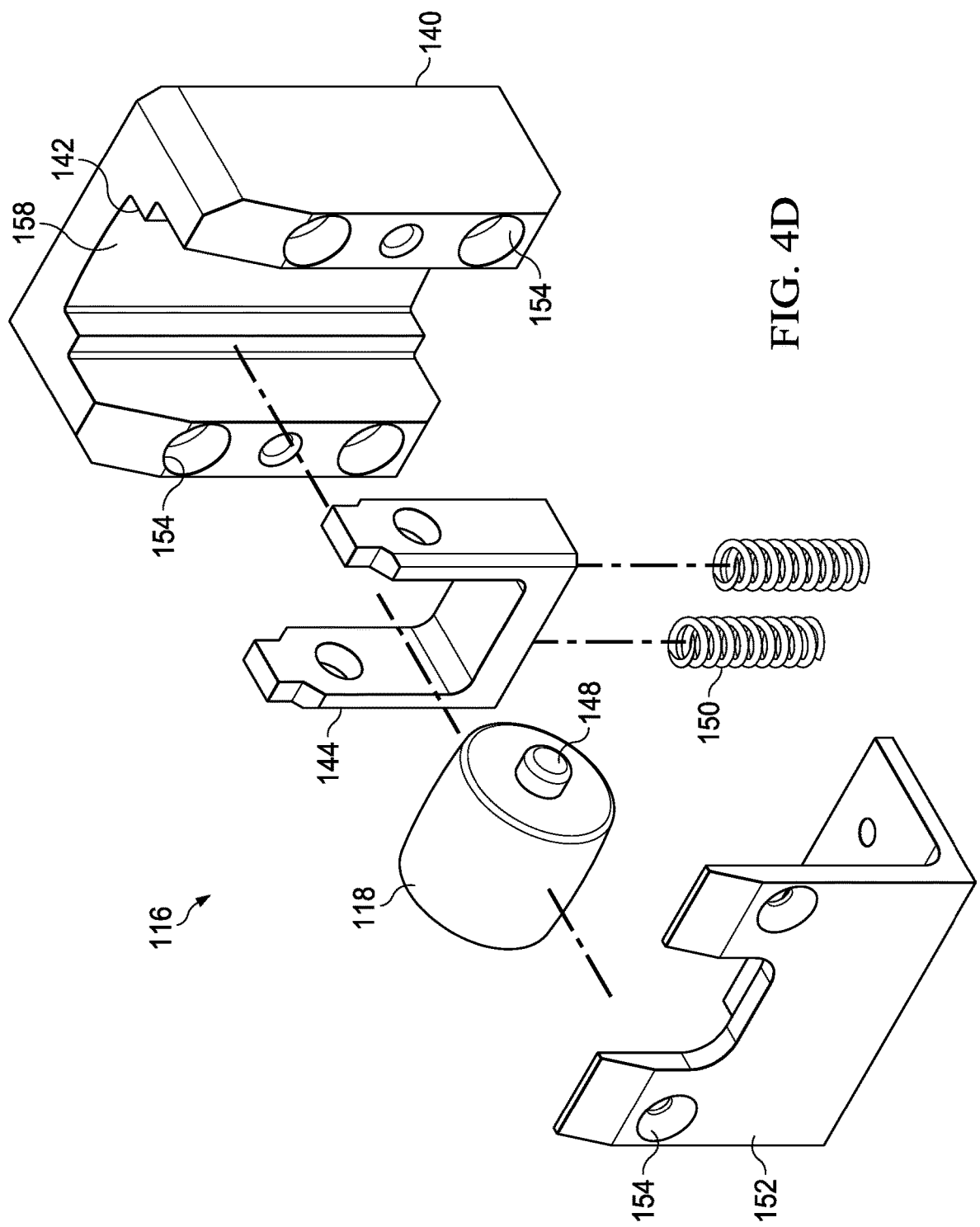

Referring to FIGS. 4A-4D, various views of roller cartridge 116 are illustrated. Roller cartridge 116 includes a cartridge housing 140. Cartridge housing 140 forms a slot 142 in which a roller bracket 144 is slidably disposed along a forward or aft direction 146, when the aircraft is in a forward flight mode. Roller bracket 144 supports an axle 148 of roller 118. Roller bracket 144 also keeps roller 118 aligned in the illustrated position and in some embodiments is not intended to directly bear flapping loads from proprotor hub assembly 102. Springs 150 are disposed beneath roller bracket 144 to bias roller 118 in a forward direction. Springs 150 push roller 118 in a forward position until roller 118 engages with gimbal lock receptacle 110 in the engaged position. While two springs 150 are illustrated, roller cartridge 116 may include any number of springs. Any type of spring may be utilized, including coiled springs, flat springs, machined springs or molded springs. Springs 150 may also be linear rate springs, variable rate springs, constant force springs or non-constant force springs. The strength and type of springs 150 may be selected to customize the amount of forward bias experienced by roller 118. A cartridge cover 152 partially encloses roller bracket 144 and springs 150 within slot 142. Cartridge cover 152 forms a front wall of a channel in which roller bracket 144 moves in the forward or aft direction 146. Fastener holes 154 may be utilized to fasten roller cartridge 116 to locking ring 114, although other fastening techniques may be used as well. As best seen in FIG. 4C, roller 118 has a bulging central section 156 to form a substantially matching curvature for contouring to annular inner wall 112 of gimbal lock receptacle 110. The roller-facing wall of slot 142 forms a contoured race 158 to complement the bulge curvature of roller 118. Because roller 118 has bulging central section 156, diameter 160 of roller 118 at bulging central section 156 is greater than diameter 162 at the ends of roller 118.

When roller 118 engages with annular inner wall 112 of gimbal lock receptacle 110 and as rolling gimbal lock assembly 106 is inserted into gimbal lock receptacle 110, roller bracket 144 and roller 118 translate in an aft direction against the bias of springs 150. Roller cartridge 116 preloads roller 118 radially outward in direction 164 to ensure engagement with annular inner wall 112 while withstanding the load forces exerted by the gimballing movement of proprotor hub assembly 102. Roller 118 and cartridge housing 140 may be formed from any material capable of withstanding loads from proprotor hub assembly 102, including a metal such as steel. Roller bracket 144 may be formed from any material capable of supporting roller 118, such as plastic. In embodiments in which roller bracket 144 is not intended to directly bear the flapping loads of proprotor hub assembly 102, roller bracket 144 may be formed from a weaker material than roller 118 or cartridge housing 140. Because roller cartridges 116 are modular in nature, they may be easily interchanged on locking ring 114 should one of them fail or malfunction.

Figure 5A:
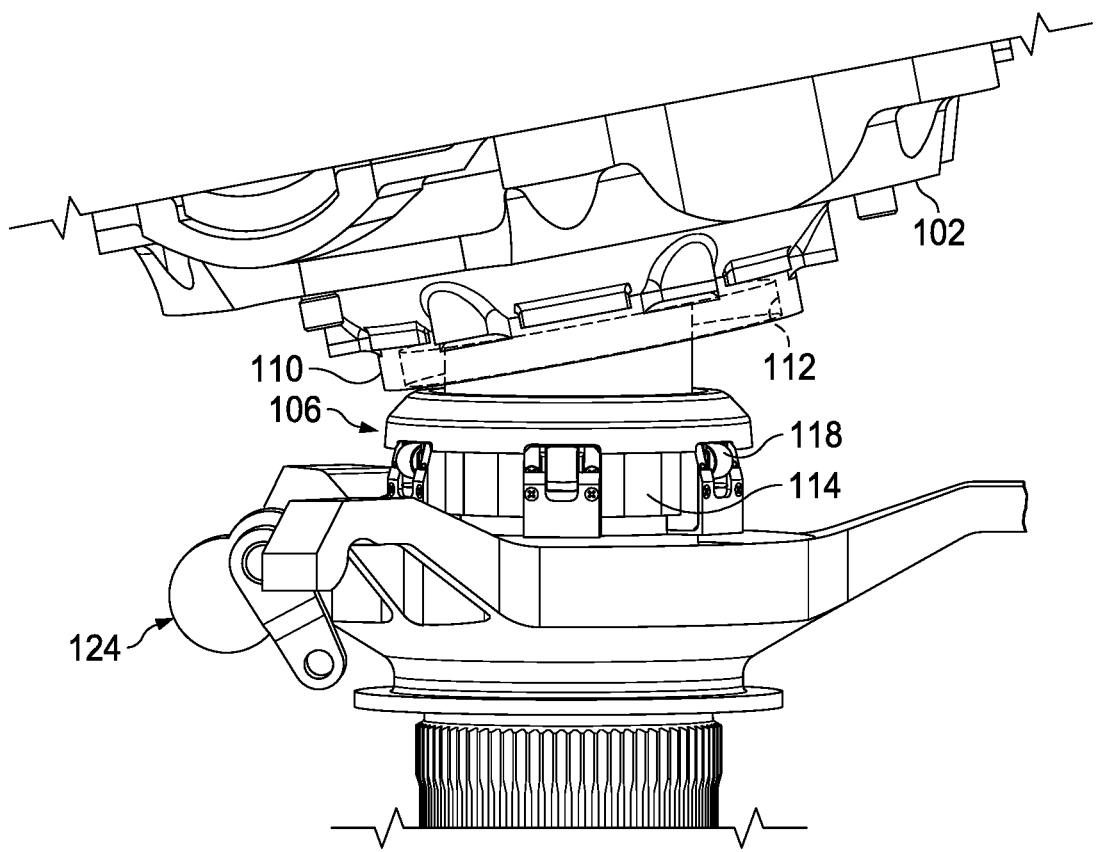
FIGS. 5A-5B are side views of a rolling gimbal lock assembly in the disengaged and engaged positions in accordance with embodiments of the present disclosure.
Figure 5B:
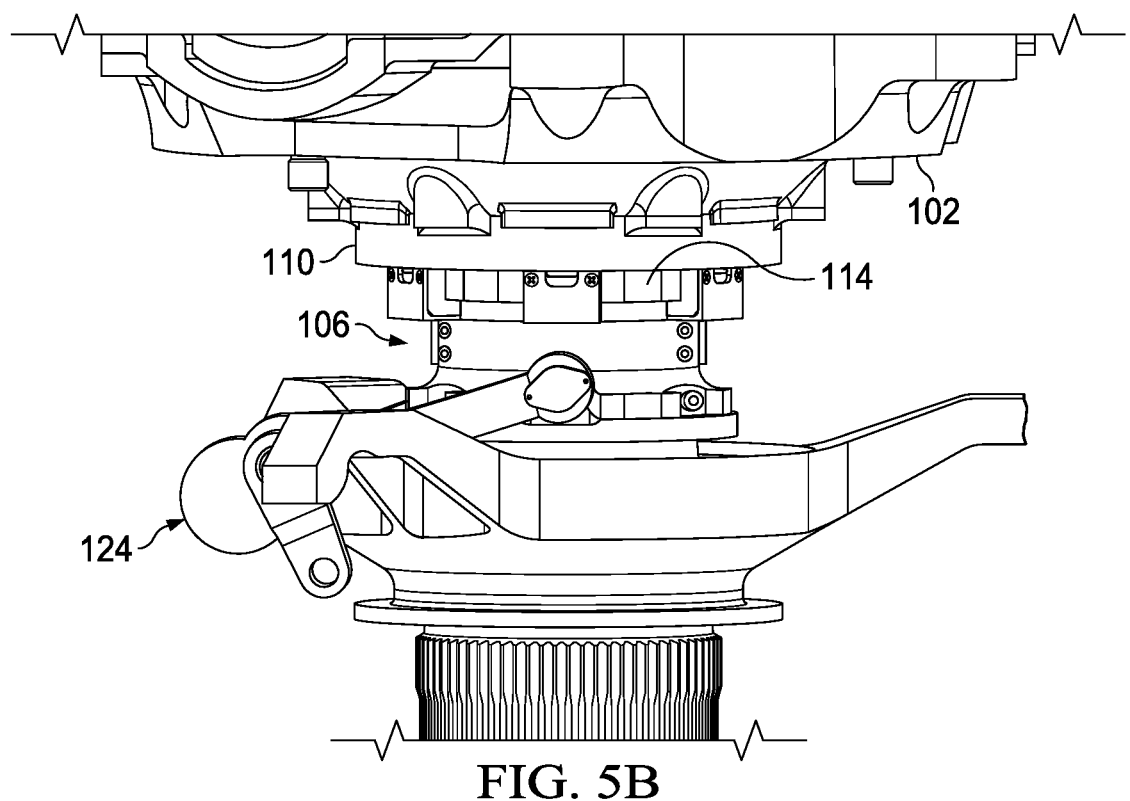

Referring to FIGS. 5A-5B in the drawings, the operation of rolling gimbal lock assembly 106 is illustrated. In FIG. 5A, actuation subassembly 124 has lowered rolling gimbal lock assembly 106 such that locking ring 114 is disengaged from gimbal lock receptacle 110 to enable the gimballing degree of freedom and flapping motion of proprotor hub assembly 102. When the flapping motion of proprotor hub assembly 102 is no longer desired or suitable, actuator subassembly 124 lifts rolling gimbal lock assembly 106 to insert locking ring 114 into gimbal lock receptacle 110 such that rollers 118 contact annular inner wall 112 of gimbal lock receptacle 110, thereby disabling the gimballing degree of freedom and flapping motion of proprotor hub assembly 102. The engaged position of rolling gimbal lock assembly 106 is shown in FIG. 5B. Rollers 118 each engage with annular inner wall 112 substantially simultaneously when in the engaged position. Rollers 118 lower the actuation force required to engage rolling gimbal lock assembly 106 with gimbal lock receptacle 110 while still being capable of a large radially outward preload to lock out proprotor hub assembly 102. Rollers 118 may contact annular inner wall 112 of gimbal lock receptacle 110 at any suitable force to prevent flapping of proprotor hub assembly 102. Rollers 118 also reduce friction and prevent any binding between rolling gimbal lock assembly 106 and gimbal lock receptacle 110 that might occur due to high moments exerted by the flapping of proprotor hub assembly 102.

Figure 6C:
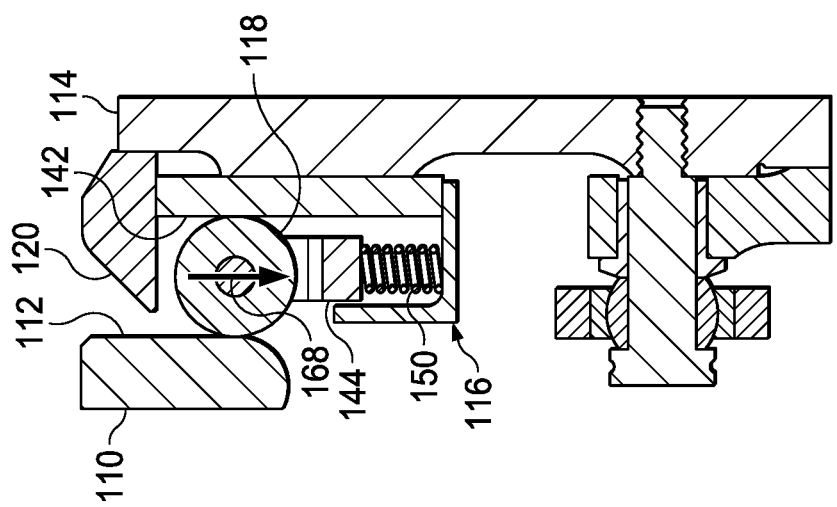
FIGS. 6A-6C are cross-sectional views of a rolling gimbal lock assembly at various stages of engagement in accordance with embodiments of the present disclosure.
Figure 6B:
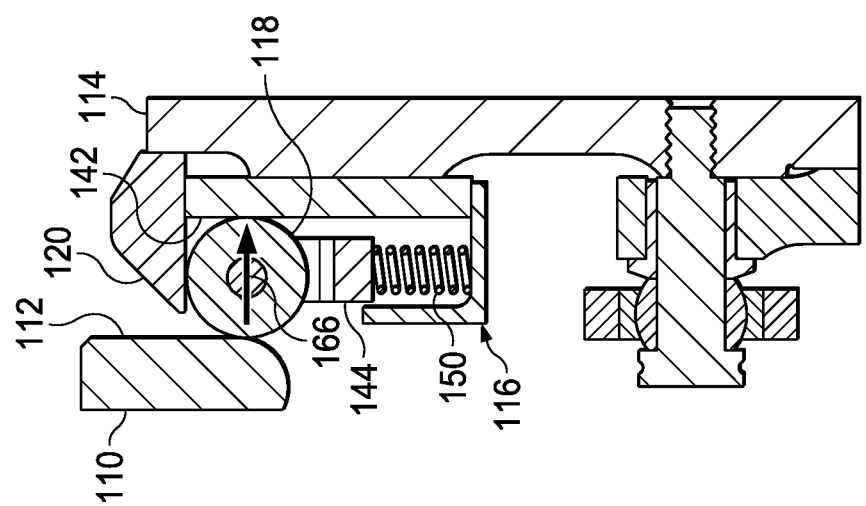
Figure 6A:
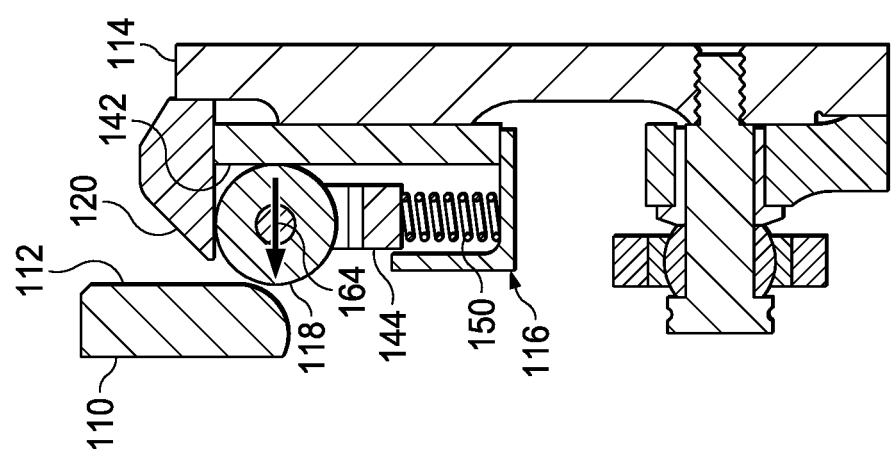

Referring to FIGS. 6A-6C in the drawings, roller 118 is illustrated before engaging with annular inner wall 112 of gimbal lock receptacle 110, at the moment of engagement with annular inner wall 112 of gimbal lock receptacle 110 and after engagement with annular inner wall 112 of gimbal lock receptacle 110. As best seen in FIG. 6A, roller cartridge 116 may be radially adjustable to vary the radially outward preload force 164 to allow rollers 118 to obtain any suitable stiffness of proprotor hub assembly 102 when rollers 118 move into the engaged position. For example, a shim of any thickness may be placed behind roller cartridge 116 to ensure that rollers 118 contact annular inner wall 112 of gimbal lock receptacle 110 substantially simultaneously. When roller 118 engages with annular inner wall 112 of gimbal lock receptacle 110, as seen in FIG. 6B, roller 118 experiences a low lock squeeze out force 166 that pushes roller 118 against the back wall of slot 142. As locking ring 114 is inserted into gimbal lock receptacle 110, as shown in FIG. 6C, roller 118 rolls against the back wall of slot 142 and experiences shear to translate in the aft direction 168. Springs 150 are compressed as locking ring 114 is inserted into gimbal lock receptacle 110. Thus, roller 118 rotates and translates in the aft direction against the bias of springs 150 in response to engaging with gimbal lock receptacle 110.

Figure 7:
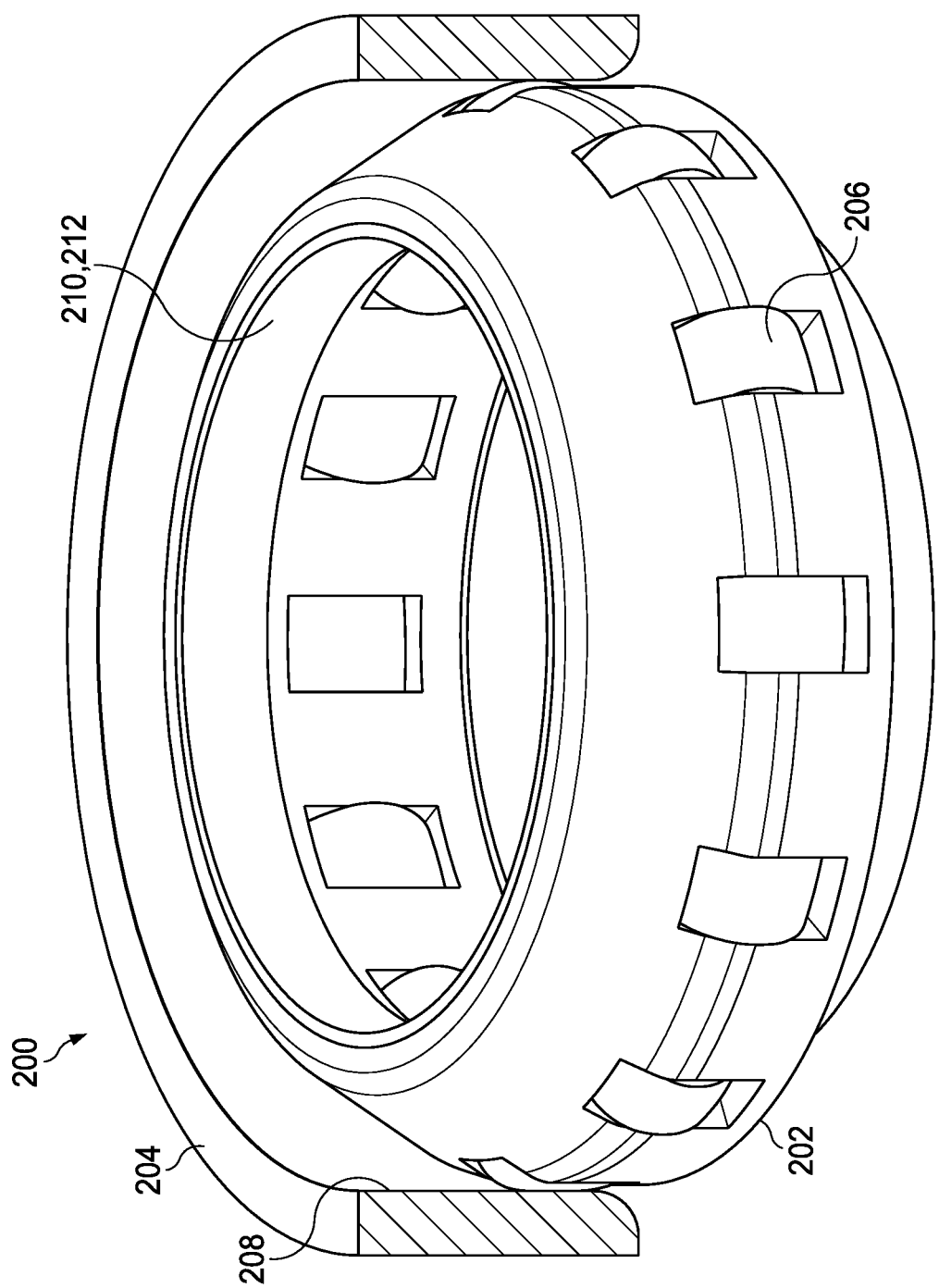
FIG. 7 is an isometric view of a rolling gimbal lock assembly in accordance with embodiments of the present disclosure.

Referring to FIG. 7 in the drawings, a rolling gimbal lock system is schematically illustrated and generally designated 200. Rolling gimbal lock system 200 includes rolling gimbal lock assembly 202 engagable with gimbal lock receptacle 204. Rolling gimbal lock assembly 202 includes rollers 206, which are not harnessed by roller cartridges. Rollers 206 may be ball and needle roller bearings. Rolling gimbal lock assembly 202 may include an annular spool or axle (not shown) to which all rollers 206 are rotatably coupled. In the illustrated embodiment, the outward-facing side of rollers 206 are shown to be contacting annular inner wall 208 of gimbal lock receptacle 204 in the engaged position while the inward-facing side of rollers 206 extend through rolling gimbal lock assembly 202. In other embodiments, the inward-facing side of rollers 206 may not extend through rolling gimbal lock assembly 202, in which case, the mast-facing inner wall 210 of rolling gimbal lock assembly 202 may include a Teflon or other coating 212 to act as a barrier between rolling gimbal lock assembly 202 and a mast extending therethrough.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A propulsion assembly for a rotorcraft comprising:
 a mast;
 a proprotor hub assembly coupled to the mast and having a gimballing degree of freedom relative to the mast; and
 a gimbal lock assembly positioned about the mast and including a plurality of circumferentially distributed rollers;
 wherein, the gimbal lock assembly is movable relative to the proprotor hub assembly between a disengaged position and an engaged position;
 wherein, in the disengaged position, the gimbal lock assembly enables the gimballing degree of freedom; and
 wherein, in the engaged position, the rollers of the gimbal lock assembly contact the proprotor hub assembly to disable the gimballing degree.

2. The propulsion assembly as recited in claim 1, wherein the proprotor hub assembly further comprises a gimbal lock receptacle adapted to receive the gimbal lock assembly, the gimbal lock assembly at least partially inserted into the gimbal lock receptacle in the engaged position such that the rollers contact the gimbal lock receptacle.

3. The propulsion assembly as recited in claim 2, wherein the gimbal lock receptacle further comprises a tubular gimbal lock receptacle having an annular inner wall, the rollers contacting the annular inner wall in the engaged position.

4. The propulsion assembly as recited in claim 3, wherein the rollers each further comprises a bulging central section to form a substantially matching curvature with the annular inner wall.

5. The propulsion assembly as recited in claim 1, wherein the gimbal lock assembly further comprises a locking ring positioned about the mast, the locking ring including the rollers.

6. The propulsion assembly as recited in claim 5, wherein the locking ring further comprises a tapered gimbal lock cap.

7. The propulsion assembly as recited in claim 5, wherein the gimbal lock assembly further comprises an actuation subassembly operably associated with the locking ring to raise and lower the locking ring relative to the mast to transition the gimbal lock assembly between the engaged and disengaged positions.

8. The propulsion assembly as recited in claim 7, wherein the actuation subassembly further comprises:
 a lifting ring operably associated with the locking ring;

a lifting fork having a bifurcated end coupled to the lifting ring; and an actuator coupled to the lifting fork operable to raise and lower the locking ring between the engaged and disengaged positions.

9. The propulsion assembly as recited in claim 1, wherein the gimbal lock assembly has a mast-facing inner wall comprising a barrier liner.

10. The propulsion assembly as recited in claim 1, wherein each of the rollers is housed within a roller cartridge.

11. The propulsion assembly as recited in claim 10, wherein each of the roller cartridges further comprises:

a cartridge housing forming a slot; and a roller bracket disposed in the slot to support the roller.

12. The propulsion assembly as recited in claim 11, wherein the slot of each cartridge housing further comprises a roller-facing wall forming a contoured race to complement a curvature of the roller.

13. The propulsion assembly as recited in claim 11, wherein each of the roller cartridges further comprises one or more springs biasing the roller bracket and the roller in a first direction.

14. The propulsion assembly as recited in claim 13, wherein for each of the roller cartridges, the roller bracket and the roller translate in a second direction opposite of the first direction against the bias force of the one or more springs in response to the roller engaging with the proprotor hub assembly.

15. A tiltrotor aircraft comprising:

a fuselage;

a wing coupled to the fuselage; and a propulsion assembly rotatably coupled to the wing, the propulsion assembly including:

a mast;

a proprotor hub assembly coupled to the mast and having a gimballing degree of freedom relative to the mast; and a gimbal lock assembly positioned about the mast and including a plurality of circumferentially distributed rollers;

wherein, the gimbal lock assembly is movable relative to the proprotor hub assembly between a disengaged position and an engaged position;

wherein, in the disengaged position, the gimbal lock assembly enables the gimballing degree of freedom; and wherein, in the engaged position, the rollers of the gimbal lock assembly contact the proprotor hub assembly to disable the gimballing degree.

16. The tiltrotor aircraft as recited in claim 15, wherein the tiltrotor aircraft is operable to transition between a rotary flight mode and a non rotary flight mode; and wherein the gimbal lock assembly is moveable into the engaged position in the non rotary flight mode to stabilize the proprotor hub assembly.

17. The tiltrotor aircraft as recited in claim 16, wherein the gimbal lock assembly is moveable into the disengaged position in the rotary flight mode to permit flapping of the proprotor hub assembly.

18. The tiltrotor aircraft as recited in claim 15, wherein the tiltrotor aircraft has a vertical takeoff and landing flight mode, the gimbal lock assembly moveable into the disengaged position in the vertical takeoff and landing flight mode to permit flapping of the proprotor hub assembly.

19. The tiltrotor aircraft as recited in claim 15, wherein the gimbal lock assembly further comprises a locking ring positioned about the mast, the locking ring including the rollers; and wherein the proprotor hub assembly further comprises a tubular gimbal lock receptacle adapted to receive the locking ring in the engaged position such that the rollers contact an annular inner wall of the gimbal lock receptacle.

20. The tiltrotor aircraft as recited in claim 15, wherein the rollers rotate and translate in response to engaging with the proprotor hub assembly.

* * * * *